United States Patent
Graf et al.

(10) Patent No.: US 10,948,020 B2
(45) Date of Patent: Mar. 16, 2021

(54) METHOD FOR PRODUCING A SUBASSEMBLY FOR A DOMESTIC APPLIANCE, AND SUBASSEMBLY

(71) Applicant: BSH Hausgeräte GmbH, Munich (DE)

(72) Inventors: Johann Graf, Kastl (DE); Angelika Namberger, Altenmarkt a.d. Alz (DE); Philipp Nather, Winsen / Luhe (DE)

(73) Assignee: BSH Hausgeräte GmbH, Munich (DE)

( * ) Notice: Subject to any disclaimer, the term of this patent is extended or adjusted under 35 U.S.C. 154(b) by 19 days.

(21) Appl. No.: 16/337,435

(22) PCT Filed: Sep. 14, 2017

(86) PCT No.: PCT/EP2017/073108
§ 371 (c)(1),
(2) Date: Mar. 28, 2019

(87) PCT Pub. No.: WO2018/059948
PCT Pub. Date: Apr. 5, 2018

(65) Prior Publication Data
US 2020/0032849 A1    Jan. 30, 2020

(30) Foreign Application Priority Data

Sep. 28, 2016 (DE) .................... 10 2016 218 754.6

(51) Int. Cl.
*F16C 29/04* (2006.01)
*F16C 43/04* (2006.01)

(52) U.S. Cl.
CPC .............. *F16C 43/04* (2013.01); *F16C 29/04* (2013.01); *F16C 2235/00* (2013.01); *F16C 2314/00* (2013.01)

(58) Field of Classification Search
CPC ...... F16C 29/04; F16C 29/043; F16C 29/045; F16C 29/046; F16C 29/048; F16C 43/04; F16C 2235/00; F16C 2314/72; A47B 88/40; A47B 88/487; A47B 88/49; A47B 88/493; B05D 3/12; B21D 53/10
See application file for complete search history.

(56) References Cited

U.S. PATENT DOCUMENTS

| | | | | |
|---|---|---|---|---|
| 4,933,530 | A * | 6/1990 | Nelson ................. | B23K 1/0004 219/85.1 |
| 6,244,679 | B1 * | 6/2001 | Robertson ............ | A47B 88/493 29/505 |
| 9,386,852 | B2 * | 7/2016 | Stijns .................. | F16C 33/3837 |

(Continued)

FOREIGN PATENT DOCUMENTS

EP    2787285 A1    10/2014

OTHER PUBLICATIONS

International Search Report PCT/EP2017/073108 dated Nov. 29, 2017.

*Primary Examiner* — Phillip A Johnson
(74) *Attorney, Agent, or Firm* — Michael E. Tschupp; Andre Pallapies; Brandon G. Braun

(57) ABSTRACT

In a method for producing a subassembly for a household appliance, at least one of a first rail and a separate second rail is cleaned by a mechanical and/or chemical cleaning operation. Subsequently the first and second rails are connected to one another so as to be able to slide relative to one another and thereby form a rail withdrawal device of the subassembly.

8 Claims, 2 Drawing Sheets

(56) References Cited

U.S. PATENT DOCUMENTS

| | | | |
|---|---|---|---|
| 2003/0079640 A1* | 5/2003 | Beatson | F16C 33/62 |
| | | | 104/106 |
| 2012/0304450 A1 | 12/2012 | Schrubke et al. | |
| 2013/0017401 A1 | 1/2013 | Rehage et al. | |
| 2013/0129265 A1* | 5/2013 | Jahrling | B21D 53/10 |
| | | | 384/20 |
| 2013/0280542 A1 | 10/2013 | Herbolsheimer et al. | |

* cited by examiner

METHOD FOR PRODUCING A SUBASSEMBLY FOR A DOMESTIC APPLIANCE, AND SUBASSEMBLY

CROSS-REFERENCES TO RELATED APPLICATIONS

This application is the U.S. National Stage of International Application No. PCT/EP2017/073108, filed Sep. 14, 2017, which designated the United States and has been published as International Publication No. WO 2018/059948 A1 and which claims the priority of German Patent Application, Serial No. 10 2016 218 754.6, filed Sep. 28, 2016, pursuant to 35 U.S.C. 119(a)-(d).

BACKGROUND OF THE INVENTION

The invention relates to a method for producing a subassembly for a household appliance, as well as to a subassembly for a household appliance. In addition, the invention also relates to a household appliance having a subassembly of said type.

It is known that in household appliances for preparing foodstuffs that have a receiving space intended for the preparation of foodstuffs, a subassembly is arranged in the receiving space, which subassembly has at least one rail withdrawal device and, separate therefrom, a retaining device on which the rail withdrawal device is arranged. In this context, the retaining device is in particular a carrier frame or rack support grid, which is arranged on a vertical side wall of an oven chamber or muffle which delimits the receiving space. The rail withdrawal device is then in turn arranged on said rack support grid. Said rail withdrawal devices are typically telescopic extendable slides having at least two rails that are displaceable relative to one another.

Household appliances of said type are baking ovens, for example. In the case of the latter it is also known that they may feature a pyrolytic function. In the pyrolysis mode of operation, relatively high temperatures, which may reach or exceed 500°, can occur in the receiving space. Standard untreated retaining devices and also rail withdrawal devices cannot be used for this purpose because at said temperatures under said environmental influences they tarnish to a bluish color due to oxidation at their surfaces or they experience an undesirable discoloration.

Components of said type are coated to counteract this effect. In this connection, reference may be made to DE 10 2010 063 887 B4. The manufacture of pyrolysis-compatible components is referred to therein, and both the application of the layers and the possible layer compositions are cited here, wherein these disclosures are also to be considered as disclosed in their entirety in the present application.

It is furthermore known that coated withdrawal devices are also subject to cleaning, as is disclosed in DE 10 2009 044 011 A1. A cleaning process of the cited type improves the subsequent layer deposition. However, the problem that occurs with said prior art according to DE 10 2009 044 011 A1 is that the fully assembled rail withdrawal device is cleaned, which operation can be carried out only to an unsatisfactory extent as a result of complexity in the designs of the components of the rail withdrawal device and consequently of the slots and the like resulting therefrom. This means that the subsequent coating process is also made possible only to a limited extent. This results in uncoated withdrawal systems which are significantly limited in terms of their longevity in particular with regard to their suitability for pyrolysis.

BRIEF SUMMARY OF THE INVENTION

It is the object of the present invention to provide a method in which a subassembly for a household appliance is improved specifically for the embodiment as a pyrolysis-compatible component. In this connection, a subassembly is then also to be a subject matter of the invention, which subassembly is produced accordingly.

In a method according to the invention, a subassembly for a household appliance is produced, the subassembly being produced with a rail withdrawal device and a further component separate therefrom. The rail withdrawal device is embodied with a first rail and a second rail separate therefrom. In the assembled state, said rails are connected to one another so as to be slidable relative to one another. Prior to the rails being assembled with one another, the first rail and/or the second rail are cleaned separately using a mechanical and/or chemical cleaning method. In other words, one rail is subjected to cleaning before being combined with the other rail. This gives rise to significant advantages since in this way each individual component, considered in isolation, can be cleaned and then a comprehensive cleaning operation can be carried out in all sections of the respective rail even in the case of embodiments with complex shapes including slots and/or undercuts or the like. Furthermore, the handling of said individual components of the rail withdrawal device in cleaning facilities is easier because a rail as such is a component that is essentially preferably integrally formed as a single piece and is inherently rigid. Relative displacements of the already preassembled rails in a cleaning operation of said type, as is the case in the prior art, therefore cannot occur. In this context, there is also no need for additional retainers in the cleaning facility that hold the rails in their position relative to one another. However, prior art rails of said type that are held in fixed positions relative to one another during the cleaning operation then in turn entail the significant disadvantage that certain sections of the rails are completely covered and are effectively not accessible, with the result that the cleaning cannot be carried out or can be carried out only with increased effort or only to an extent that is unsatisfactory for the further processing operations.

All this can be avoided using the method according to the invention.

In an advantageous embodiment, the first rail is coated with a layer comprising silicon oxide or silicon dioxide following the mechanical and/or chemical cleaning operation and before being assembled with the second rail. Said coating with material compositions of the aforesaid type in particular is particularly advantageous, as is explained in the already above-cited DE 10 2010 063 887 B4.

Preferably, the second rail is coated with a layer comprising silicon oxide and/or silicon dioxide following the mechanical and/or chemical cleaning operation and before being assembled with the first rail.

If the two rails are coupled into one another in the assembled state with a subject device which enables the displacement relative to one another, and if said device comprises rolling elements such as rollers or balls, then it is advantageous if the rails are not coated at those points, in particular on the raceways, along which said rolling elements then roll in a contact-making manner.

Preferably it is provided that prior to undergoing cleaning the first rail is mounted to a further component of the subassembly embodied as a retaining device and the first rail is cleaned together with the retaining device by means of the mechanical and/or chemical cleaning method. Since it is provided in an advantageous embodiment that a rail withdrawal device of said type is arranged on an inner face of a vertical side wall, in particular on a muffle which delimits a receiving space of the household appliance intended for preparing foodstuffs, an adapter device of said type in the form of the retaining device is particularly advantageous. Said retaining device can then be arranged directly on said inner face of the side wall and the rail withdrawal device can then be arranged more easily on said retaining device and is thus fastened indirectly to said vertical side wall. It is particularly advantageous specifically when in said subassembly production method the connection of one of the two rails, specifically the first rail, to the retaining device is carried out first and then said entire intermediate module is cleaned. Since a retaining device of said type, such as in particular a rack support grid, is embodied more simply in terms of complexity of shape and occurring undercuts or cavities or the like, inadequate cleaning operations of said entire intermediate module can be avoided in this case also. Furthermore, a quick and comprehensive cleaning is made possible by means of an embodiment of said type, and consequently then also an immediately relatively fast further processing process, in particular with regard to the coating, is facilitated already after the cleaning. Disadvantageous adverse effects on the first rail and/or the retaining device after the cleaning operation, if said two components were then to be combined with one another only after the cleaning operation, can be prevented as a result.

Preferably it is provided that the first rail together with the retaining device is coated with a layer comprising silicon oxide and/or silicon dioxide. A faster coating process can then be performed in this case too, since said intermediate module is immediately coated as a whole. It is then possible in this case also to avoid unwanted layer fish-scaling or chipping or the like, since after the coating no further joining process between the retaining device and the first rail is necessary any longer.

Preferably it is provided that a rolling element device is prefabricated with a rolling element cage and rolling elements arranged thereon and said rolling element device is attached to the first rail after the first rail has been coated and before the first rail is connected to the second rail. This is a very advantageous embodiment, since in this way said independent subject component in the form of the rolling element device can also be assembled initially, considered in isolation, and in this context the rolling elements can be fastened to the rolling element cage. This module, then in turn produced separately, namely the rolling element device, can then be simply mounted, in particular push-fitted, onto the first rail in further assembly steps. By this means it is then also avoided in this embodiment that possibly unwanted cleaning operations occur specifically for rolling elements and/or also the coating does not reach said rolling elements. That too is a corresponding disadvantage in the prior art, leading to the impairment of the running action of the rolling elements, and severely compromising their long-term functionality.

Preferably it is provided that after the rolling element device has been mounted on the first rail the second rail is push-fitted onto the first rail such that the rolling element device is arranged in an intermediate space between the two rails and the two rails can be displaced relative to one another by means of the rolling element device. By means of an embodiment of said type, the assembly of the rail withdrawal device with its separate components is then also simplified.

It can be provided that a blasting method, such as, for example, an ice blasting process with blasting medium additive and/or a carbon dioxide pellet blasting process and/or a carbon dioxide snow blasting process, is performed as a mechanical cleaning method. As an alternative to a blasting method, an ultrasound method and/or a plasma method and/or a laser cleaning process can also be performed. A cleaning operation can be performed using liquid carbon dioxide and/or alkaline solutions and/or calcium carbonate and/or chemical stripping as a chemical cleaning method.

Preferably the coating is applied by means of a plasma method or a plasma deposition method.

What is achieved in the production method for the subassembly is that a highly modular manufacturing process can be realized, whereby individual components can be prefabricated as modules and then simply mounted with other components or modules, wherein as a result of said modular embodiment certain of said components or modules can then be mounted individually also at specific production times with regard to the cleaning and/or coating process and in the present connection assembled at a given time with other components. Both the basic mechanical assembly and the cleaning and/or coating operations can then be carried out very individually in coordination with one another and the respective operation for the one or other component and/or module can then be performed very much in line with requirements.

Particularly the complicated and laborious mounting of rolling elements in a more or less independent assembly is then avoided in this case, since the rolling element device is produced separately here as a prefabricated module with the rolling element cage and the rolling elements fastened thereto.

The invention further relates to a subassembly for a household appliance, wherein the subassembly is produced in accordance with the method or an advantageous embodiment thereof.

In addition, the invention also relates to a household appliance intended for preparing foodstuffs that has a subassembly of said type. The subassembly is arranged in particular in a receiving space for preparing foodstuffs, in particular a cooking chamber, and a cooked food carrier such as a baking tray, a drip pan or a grill rack can be mounted on a rail withdrawal device. It is then possible to slide said cooked food carrier out of the cooking chamber or into the cooking chamber in the depth direction of the household appliance by means of the rail withdrawal devices.

Further features of the invention will become apparent from the claims, the figures and the description of the figures. The features and feature combinations cited hereinabove in the description, as well as the features and feature combinations cited hereinbelow in the description of the figures and/or shown solely in the figures, can be used not only in the combination indicated in each case, but also in other combinations, without departing from the scope of the invention. There are therefore also embodiments to be considered as encompassed and disclosed by the invention which are not explicitly shown and explained in the figures, but which are derived and may be produced from the explained embodiments by means of separate feature combinations. Embodiments and feature combinations which therefore do not include all features of an originally formulated independent claim are also to be considered as disclosed. Furthermore, embodiments and feature combinations which go beyond or diverge from the feature combinations presented in the back-references of the claims are to be considered as disclosed, in particular by the above-explained embodiments.

BRIEF DESCRIPTION OF THE DRAWINGS

Exemplary embodiments of the invention are explained in more detail below with reference to schematic drawings, in which.

DETAILED DESCRIPTION OF EXEMPLARY EMBODIMENTS OF THE PRESENT INVENTION

In the figures, like or functionally like elements are labeled with like reference signs.

Figure 1:
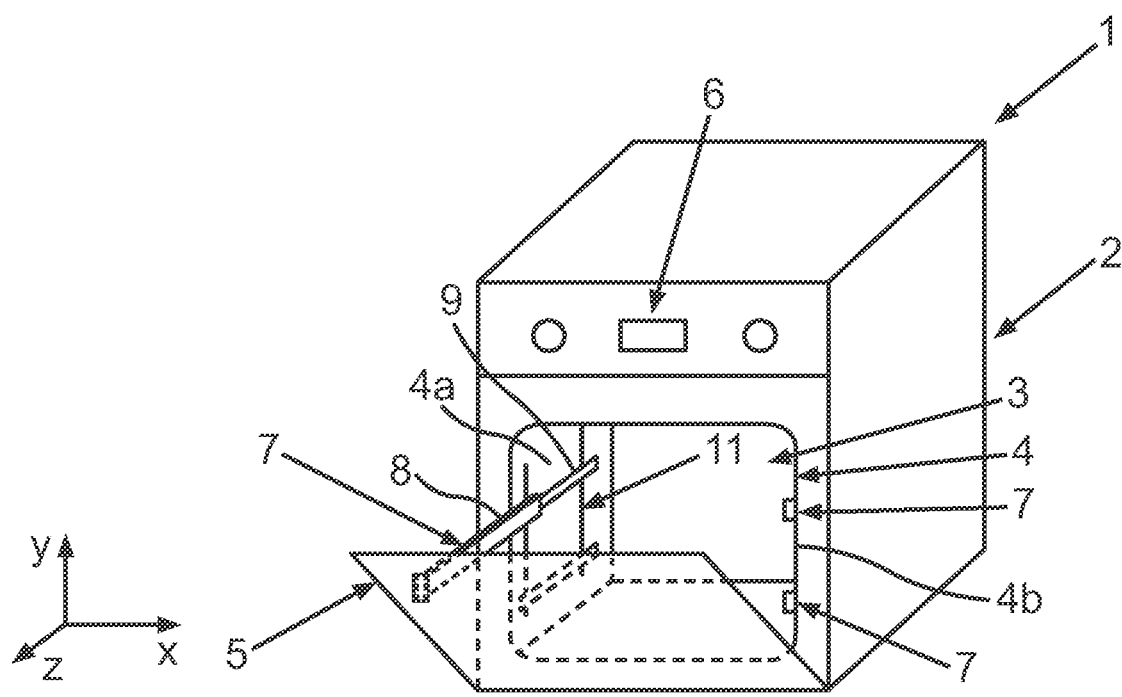
FIG. 1 shows a schematic view of an exemplary embodiment of a household appliance according to the invention.

FIG. 1 is a simplified perspective view showing a household appliance 1 which is embodied for the preparation of foodstuffs and is a cooking appliance, for example. The household appliance 1 comprises a housing 2 in which there is formed a cooking chamber 3 which is delimited by walls of a muffle 4. In addition, the household appliance 1 comprises a door 5 which is embodied for closing the cooking chamber 3 and is arranged in a pivotable manner on the housing 2. A user control and/or display device 6, to be understood simply by way of example in terms of its embodiment and location, is present.

A plurality of rail withdrawal devices 7, one of which is explained in more detail below, are arranged on opposite vertical side walls 4a and 4b of the muffle 4.

The rail withdrawal devices 7 are arranged in pairs opposite one another at the same levels, considered along a height direction (y-direction), such that insertion levels are also defined hereby. A cooked food carrier, such as a grill rack, a drip pan or a baking tray, for example, can be placed on said rail withdrawal devices 7 assigned in pairs and thus be slid into the cooking chamber 3 or withdrawn from the cooking chamber 3 in the depth direction (z-direction).

FIG. 1 shows an exemplary embodiment of a rail withdrawal device 7 in a perspective view. In the embodiment shown, the rail withdrawal device 7 comprises a first rail 8 and a rail 9 separate therefrom. The rail withdrawal device 7 has a longitudinal axis L, which is also the longitudinal axis of the two rails 8 and 9. The two rails 8 and 9 are displaceable relative to one another in the direction of said longitudinal axis, by means of which a displacement direction is also defined. The two rails 8 and 9 are substantially equal in length or one of the two rails is formed with a length that is between 80 percent and 100 percent of the length of the other rail. The first rail 8 represents an outer rail which forms the runner rail. The second rail 9 is an inner rail and represents a fixed rail, which means that it is fastened to the inner face of the side wall 4a.

The first rail 8 surrounds the second rail 9 or the second rail 9 is installed or guided in the first rail 8. The two rails 8 and 9 are embodied as hollow, in particular in the manner of a channel.

Figure 2:
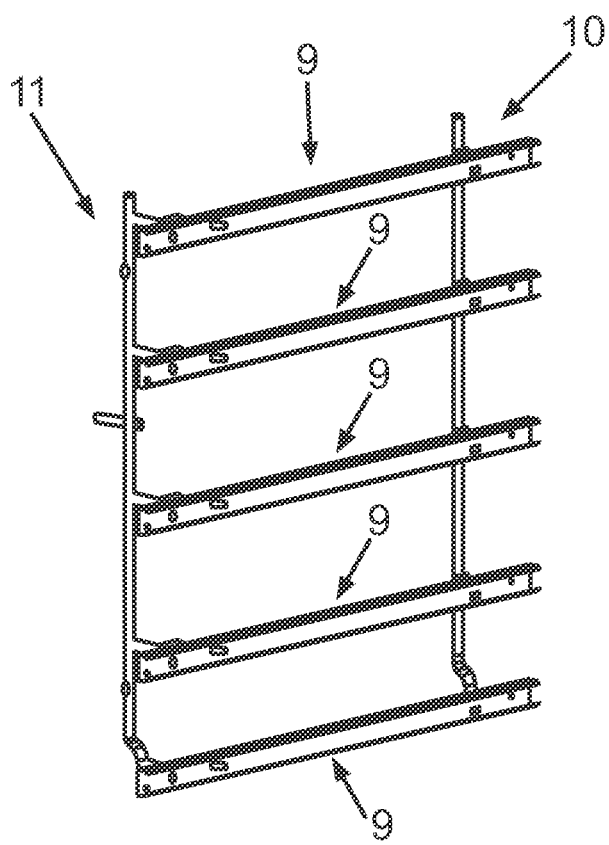
FIG. 2 shows a perspective view of components of a subassembly of the household appliance in a specific stage of a production method.

FIG. 2 shows components of a subassembly 10. The subassembly 10 comprises a retaining device 11, which in the exemplary embodiment is a rack support grid. In addition, the subassembly 10 also comprises the rail withdrawal device 7, as has already been explained with reference to FIG. 1.

As can be seen in FIG. 1, in the finished assembled state the subassembly 10 is arranged on a vertical side wall, a subassembly 10 of said type being arranged with a retaining device 11 and at least one rail withdrawal device 7 both on the left-hand vertical side wall 4a and on the right-hand vertical side wall 4b. In this arrangement, the rail withdrawal device 7 is fastened to the retaining device 11 and consequently arranged indirectly on a vertical side wall 4a or 4b.

In order to produce the subassembly 10, it is provided here in the first instance that the rack support grid or retaining device 11 is provided in one method step. In addition, the second rail 9 is provided as a separate part by the rail withdrawal device 7. In this manufacturing state, the rail withdrawal device 7 is therefore still fully disassembled. In FIG. 2 it is shown, in a manner to be understood simply by way of example, that a plurality of rail withdrawal devices can then be arranged on the retaining device 11, so that a plurality of second rails 9 are also shown here. Said rails 9, of which henceforth reference will always merely be made to one of the rails, are then mounted on the retaining device 11. For example, a screwing or snap-fitting or hooking-in operation may be provided in this case.

As the following method step, said intermediate module is cleaned together with the retaining device 11 and the rails 9 fastened thereto, a mechanical and/or chemical cleaning method being carried out for this purpose.

Following said cleaning operation or before said cleaning operation or concurrently with said cleaning operation, a corresponding cleaning of the first rail 8 can also be carried out by means of a chemical and/or mechanical cleaning method of the first rail 8, the first rail then likewise still being provided here as a separate component.

After the cleaning of the intermediate assembly module, as is shown in FIG. 2, a coating process is performed, at least one layer comprising silicon oxide and/or silicon dioxide being applied in this case. Preferably a multilayer coating is applied, which may then also comprise another layer, for example silicon carbide. Preferably an outer layer is a silicon oxide layer or a silicon dioxide layer.

The coating is preferably performed by means of a plasma deposition method and said coating is performed in particular using a high-rate PECVD deposition method, said silicon oxide layer or silicon dioxide layer being produced as an outer layer at a deposition rate of greater than 0.5 μm/min.

Figure 3:
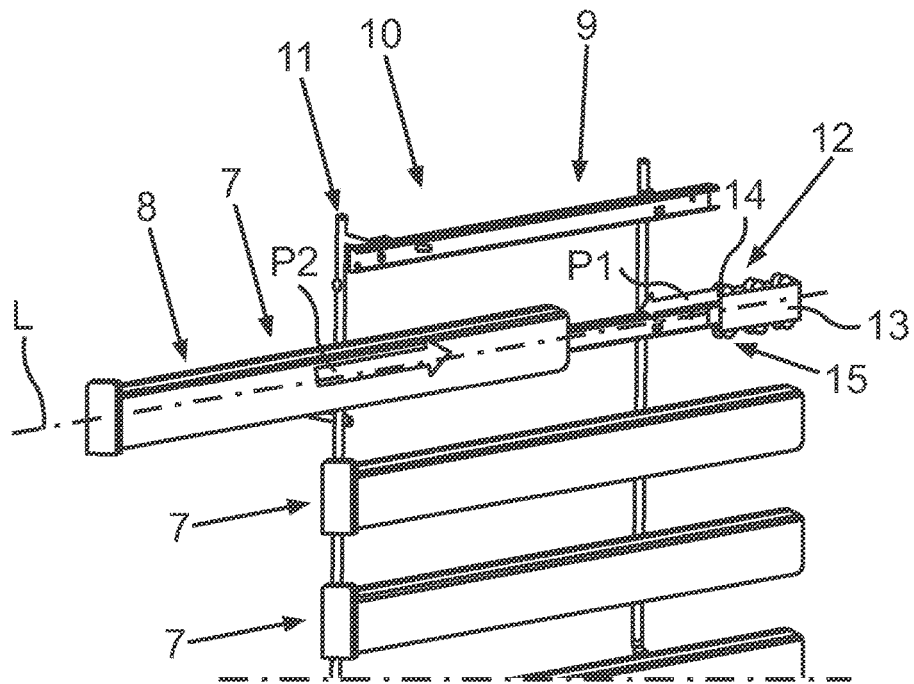
FIG. 3 shows a perspective view of the subassembly according to FIG. 2 with further components that are mounted.

Once said coating of said intermediate assembly module comprising the retaining device 11 and a second rail 9 of a rail withdrawal device 7 has been completed, the further assembly of the rail withdrawal device 7 is performed. To that end, as is shown in FIG. 3, onto a second rail 9, a likewise produced intermediate module in the form of a rolling element device 12 is then firstly push-fitted onto said second rail 9 according to arrow P1. Said rolling element device 12 comprises a rolling element cage 13 and rolling elements 14 mounted thereon. In the exemplary embodiment it is provided that the rolling element cage 13 is a carrier component, C-shaped in cross-section, on the top wall of which a plurality of rolling elements 14, in particular three, are arranged and on an oppositely disposed base wall of which a plurality of further rolling elements 15, in particular three, are arranged. The rolling elements 14 and 15 may be rollers or balls and they are in each case mounted on the rolling element cage 13 so as to be rotatable via an axis mounting arrangement.

In the assembled state, the second rail 9 therefore extends through the hollow, in particular C-shaped, rolling element carrier or rolling element cage 13.

Following said assembly of the rolling element device 12 on the second rail 9, the first rail 8, which has then likewise been cleaned and optionally also coated subsequent to the cleaning operation, is push-fitted, as is indicated by the arrow P2. The assembly or push-fitting of the rolling element device 12 onto the second rail 9 is represented by the arrow P1. In the assembled state, said rolling element device 12 is then arranged in an intermediate space between the first rail 8 and the second rail 9. In FIG. 3, the lower two rail withdrawal devices 7 are shown already in the assembled final state, and moreover in the inserted state.

Figure 4:
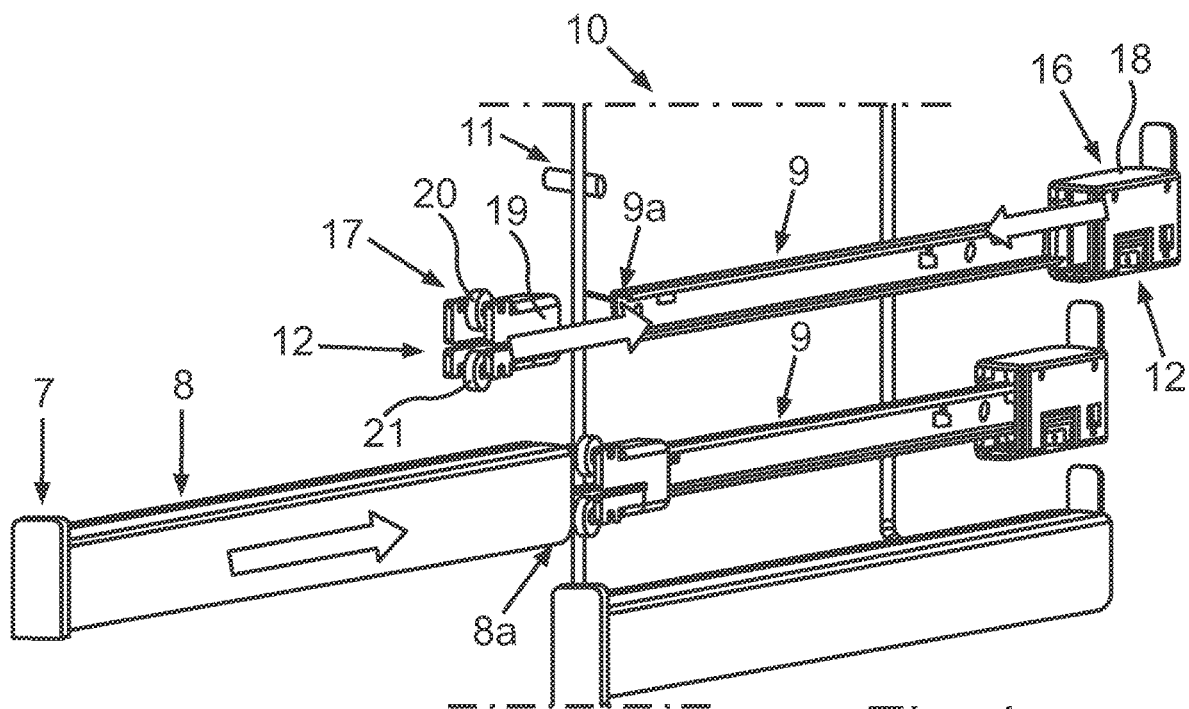
FIG. 4 shows a perspective view of a further exemplary embodiment of a subassembly of the household appliance.

FIG. 4 shows a view of a further exemplary embodiment of a subassembly 10. In contrast to the embodiment according to FIG. 3, it is provided in this case that the embodiments of the rolling element devices 12 are different. In the implementation according to FIG. 3, only one rolling element device 12 is provided per rail withdrawal device 7, which rolling element device 12 is arranged in that case as displaceable relative to both rails 8 and 9 in the intermediate space between the rails 8 and 9. The rolling element device 12 can therefore be displaced relatively along the longitudinal axis L of the rail withdrawal device 7, which axis also represents the displacement direction of the two rails 8 and 9 relative to one another.

In FIG. 4 it is provided that the rolling element device 12 has two separate rolling element units 16 and 17 which are arranged at different ends and are separate units. It is provided in particular that the rear rolling element unit 16 has a rolling element carrier 18 on which a plurality of rolling elements are rotatably mounted. Said rolling element unit 16 is preferably arranged in a fixed position on the first rail 8, in particular clipped or snap-fitted into place, and then fastened in particular to a rear end 8a of said first rail 8. The rolling elements of said first rolling element unit 16 then run on raceways of the second rail 9. The further rolling element unit 17 likewise comprises a rolling element carrier 19, on which two rolling elements 20 and 21 are rotatably mounted in the exemplary embodiment. Said further rolling element unit 17 is arranged in a fixed position on the second rail 9, in particular at a front end 9a. The rolling elements 20 and 21 then contact raceways on the first rail 8. In this implementation too, the production method corresponds to the implementation shown in FIG. 2 and FIG. 3. Instead of the rolling element device 12 being push-fitted, in this case, in the corresponding method step, the rolling element unit 17 is then mounted on the second rail 9 before the first rail 8 is push-fitted. In addition, the rolling element unit 16 is push-fitted onto the second rail 9 and then connected, in particular snap-fitted, to the second rail 8 when the second rail 8 is slid over the rolling element unit 17 fastened to the second rail 9.

The invention claimed is:

1. A subassembly for a household appliance, said subassembly comprising:
   a rail withdrawal device including a first rail and a separate second rail which are connected to one another so as to be able to slide relative to one another, at least one of the first and second rails being cleaned by a mechanical and/or chemical cleaning operation before being connected to one another; and
   a prefabricated rolling element device with a rolling element cage and rolling elements arranged thereon, said rolling element device being attached at least in subcomponents to the second rail after the second rail has been coated and before the first rail is connected to the second rail.

2. The subassembly of claim 1, wherein the at least one of the first and second rails is the first rail, said first rail being coated with a layer comprising silicon oxide and/or silicon dioxide after the first rail has undergone the mechanical and/or chemical cleaning operation and before being connected with the second rail.

3. The subassembly of claim 1, wherein the at least one of the first and second rails is the second rail, said second rail being coated with a layer comprising silicon oxide and/or silicon dioxide after the second rail has undergone the mechanical and/or chemical cleaning operation and before being connected with the first rail.

4. The subassembly of claim 1, further comprising a further component embodying a retaining device, wherein the at least one of the first and second rails is the second rail and is mounted to the further component, said second rail together with the retaining device being cleaned by the mechanical and/or chemical cleaning operation.

5. The subassembly of claim 4, wherein the second rail together with the retaining device is coated with a layer comprising silicon oxide and/or silicon dioxide.

6. The subassembly of claim 1, wherein, after the rolling element device has been attached on the second rail, the first rail is push-fitted onto the second rail such that the rolling element device is arranged in an intermediate space between the first and second rails to thereby allow displacement of the first and second rails relative to one another via the rolling element device.

7. The subassembly of claim 1, wherein the mechanical cleaning operation includes a blasting process selected from the group consisting of an ice blasting process with blasting medium additive, a carbon dioxide pellet blasting process, a carbon dioxide snow blasting process, an ultrasound subassembly, a plasma subassembly and a laser cleaning process, and/or wherein the chemical cleaning operation is a process using liquid carbon dioxide, alkaline solutions, calcium carbonate and/or chemical stripping.

8. The subassembly of claim 1, wherein the at least one of the first and second rail process is coated using a plasma process with a layer comprising silicon oxide and/or silicon dioxide after the at least one of the first and second rails has undergone the mechanical and/or chemical cleaning operation and before the first and second rail are connected to one another.

* * * * *